(12) United States Patent
Iijima et al.

(10) Patent No.: US 9,685,824 B2
(45) Date of Patent: *Jun. 20, 2017

(54) CONTACTLESS METHOD OF SUPPLYING POWER

(71) Applicant: SANYO ELECTRIC CO., LTD., Osaka (JP)

(72) Inventors: Yasuhiro Iijima, Sumoto (JP); Masahiro Tomiki, Minamiawaji (JP); Yuji Arai, Sumoto (JP); Yosuke Tanida, Sumoto (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 421 days.

This patent is subject to a terminal disclaimer.

(21) Appl. No.: 13/867,354

(22) Filed: Apr. 22, 2013

(65) Prior Publication Data
US 2013/0285618 A1    Oct. 31, 2013

(30) Foreign Application Priority Data
Apr. 25, 2012  (JP) ................................ 2012-100410

(51) Int. Cl.
*H02J 17/00*  (2006.01)
*H02J 7/02*  (2016.01)
*H02J 5/00*  (2016.01)

(52) U.S. Cl.
CPC .............. *H02J 17/00* (2013.01); *H02J 5/005* (2013.01); *H02J 7/025* (2013.01)

(58) Field of Classification Search
CPC ..................................................... H02J 7/025

USPC ......................................................... 320/137
See application file for complete search history.

(56) References Cited

U.S. PATENT DOCUMENTS

| | | | | |
|---|---|---|---|---|
| 6,118,249 A * | 9/2000 | Brockmann | ............ | H02J 7/025 320/106 |
| 7,812,481 B2 * | 10/2010 | Iisaka | ..................... | H02J 7/025 307/104 |
| 8,064,825 B2 * | 11/2011 | Onishi | ................. | H04B 1/3883 327/33 |

(Continued)

FOREIGN PATENT DOCUMENTS

JP          2008-17562         1/2008

*Primary Examiner* — Samuel Berhanu
*Assistant Examiner* — Tessema Kebede
(74) *Attorney, Agent, or Firm* — Wenderoth, Lind & Ponack, L.L.P.

(57) ABSTRACT

Power supply stand output to the portable device is adjusted according to the power adjustment signals. Maximum power supply stand output is limited to a power output threshold value. The portable device compares the power received from the power supply stand to the required power. When the received power is lower than the required power, the portable device sends a power adjustment signal to the power supply stand, which is an increase-power-request signal. When the received power is greater than the required power, the portable device sends a decrease-power-request signal to the power supply stand. The power supply stand adjusts output and limits it to the power output threshold value. When continuous output of increase-power-request signals from the portable device is detected over a preset time period, a foreign object is determined to be on the power supply stand.

7 Claims, 5 Drawing Sheets

(56) References Cited

U.S. PATENT DOCUMENTS

| | | | | |
|---|---|---|---|---|
| 8,084,991 B2* | 12/2011 | Yoda | ............... | H01M 10/44 |
| | | | | 320/108 |
| 9,007,019 B2* | 4/2015 | Iijima | ............... | H02J 7/0052 |
| | | | | 320/108 |
| 2008/0303479 A1* | 12/2008 | Park et al. | ............... | 320/108 |
| 2009/0021219 A1* | 1/2009 | Yoda | ............... | H02J 7/0011 |
| | | | | 320/137 |
| 2011/0140538 A1* | 6/2011 | Jung et al. | ............... | 307/104 |
| 2011/0270462 A1* | 11/2011 | Amano et al. | ............... | 700/297 |
| 2012/0175967 A1* | 7/2012 | Dibben et al. | ............... | 307/104 |

* cited by examiner

CONTACTLESS METHOD OF SUPPLYING POWER

BACKGROUND OF THE INVENTION

1. Field of the Invention

The present invention relates to a contactless (wireless) method of supplying power that disposes a transmitting coil and a receiving coil in close proximity to magnetically couple the coils to supply power from the transmitting coil to the receiving coil by magnetic induction, and in particular to a contactless method of supplying power that detects foreign objects on the power supply stand.

2. Description of the Related Art

A contactless method of supplying power that places a portable device housing a receiving coil on a power supply stand (pad, platform, stage, cradle) housing a transmitting coil and transmits power from the transmitting coil to the receiving coil has been developed. (Refer to Japanese Laid-Open Patent Publication 2008-17562.)

In the contactless method of supplying power of the related disclosure, a charging pad serves as the power supply stand, a battery powered device serves as the portable device, and power is transmitted from the charging pad to the battery powered device to charge a battery internal to the battery powered device. For contactless charging, the portable device receiving coil is put in close proximity with the power supply stand transmitting coil to supply power from the transmitting coil to the receiving coil. The internal battery is charged by power induced in the receiving coil. In this method of supplying power, power can be transmitted to the portable device in a contactless manner and there is no need to connect the portable device to the power supply stand via connectors.

This method of supplying power has the drawback that if a metal foreign object such as a paper clip is on the power supply stand when it is supplying power, current will be induced in the foreign object, which will generate heat due to Joule-heating. Further, since wasted power is consumed by current induced in the foreign object, this method also has the drawback that power cannot be supplied from the power supply stand to the portable device in an efficient manner.

To eliminate these drawbacks, the charging pad cited in JP 2008-17562 has many temperature sensors disposed in an x-y array on its upper surface to detect foreign objects. The temperature sensors detect heat generated by a foreign object on the charging pad. If alternating current (AC) power is supplied to the transmitting coil of this charging pad with a metal foreign object on its upper surface, heat will be generated by current induced in the foreign object and that heat will be detected by a nearby temperature sensor.

Since the charging pad described above requires temperature sensors for detection and decision circuitry to judge the presence of foreign objects from temperature detected by the temperature sensors, it has the drawbacks of complex circuit structure (for foreign object detection) and high manufacturing cost. It also has drawbacks such as the inability to stably and reliably detect a foreign object positioned at a distance from the nearest temperature sensor, and delayed detection (resulting in detrimental conditions such as excessive heat generated by the foreign object). Further, since this charging pad judges the presence of a foreign object by detecting its heat generation with temperature sensors, it also has the drawback that the foreign object cannot be safely detected without heating it (possibly to an excessive temperature).

The present invention was developed with the object of further eliminating the drawbacks described above. Thus, it is an object of the present invention to provide a contactless method of supplying power that can quickly, stably, and reliably detect foreign objects with a simple circuit structure and low manufacturing cost. Further, it is another object of the present invention to provide a contactless method of supplying power that can safely detect foreign object presence.

SUMMARY OF THE INVENTION

In the contactless method of supplying power of the present invention, a portable device housing a receiving coil is placed on a power supply stand provided with a transmitting coil, the portable device receiving coil is magnetically coupled with the power supply stand transmitting coil, and power is transmitted from the transmitting coil to the receiving coil by magnetic induction. Further, the portable device sends power adjustment signals to the power supply stand requesting increase or decrease in power. The power supply stand regulates transmitting coil output power to supply the power requested by the portable device based on the power adjustment signals. Power supply stand output is limited to power that is at or below a power output threshold, and the portable device compares the power received from the power supply stand to the power required. When the received power is lower than the required power, the portable device sends a power adjustment signal to the power supply stand, which is an increase-power-request signal. When the received power is greater than the required power, the portable device sends a decrease-power-request signal. The power supply stand adjusts its output according to the increase-power-request signals and decrease-power-request signals, and when increase-power-request signals are continuously transmitted from the portable device over a preset time period, a foreign object is judged to be on the power supply stand.

The contactless method of supplying power described above has the characteristic that it can quickly, stably, and reliably detect foreign objects on the power supply stand with a simple circuit structure and low manufacturing cost. This is because the power supply stand adjusts its output while limiting output power to a power output threshold, and determines that a foreign object is on the power supply stand when increase-power-request signals are continuously detected for a preset time period. Here, increase-power-request signals and decrease-power-request signals are sent from the portable device to the power supply stand to adjust output power and the power supply stand adjusts output power below the power output threshold. In this contactless method of supplying power, if a (metal) foreign object is placed on the power supply stand, it will absorb power from the transmitting coil and transmission efficiency will drop. If transmission efficiency drops, portable device received power will decrease and become lower than the required power. In that situation, the portable device will output an increase-power-request signal. The power supply stand will detect the increase-power-request signal and increase its output, but it will limit its maximum output to the power output threshold value. In this case, even if power supply stand output is increased to the power output threshold, portable device received power will not rise to the required power and the portable device will continuously output increase-power-request signals. Namely, when a foreign object is on the power supply stand, the portable device will continuously issue increase-power-request signals. The power supply stand detects increase-power-request signals continuously output from the portable device and determines that a foreign object is present. Since power supply stand output is limited to the power output threshold value, this contactless method of supplying power can prevent foreign object heating to a detrimentally high temperature. Further, since this contactless method of supplying power determines foreign object presence by detecting increase-power-request signals continuously output from the portable device, there is no need to provide temperature sensors on the power supply stand and circuit structure is simplified.

In the contactless method of supplying power described above, foreign object presence is not determined by detecting foreign object heat generation with temperature sensors as in prior art, but rather foreign object presence reduces power transmission efficiency and increase-power-request signals continuously output from the portable device are detected. Consequently, this method achieves the characteristic that foreign objects can be detected safely.

In the contactless method of supplying power of the present invention, power output threshold values can vary according to the power requested by the portable device, and the power output threshold can increase when the requested power increases. Since the power output threshold value increases with the portable device requested power, this contactless method of supplying power has the characteristic that foreign objects can be detected while supplying the necessary power to the portable device.

In the contactless method of supplying power of the present invention, the power output threshold value can be set according to the portable device received power and the foreign object detection threshold value or efficiency for foreign object detection. This contactless method of supplying power has the characteristic that foreign objects can be detected while supplying a given amount of power to the portable device.

In the contactless method of supplying power of the present invention, the power output threshold value can be set according to the maximum rated power of the portable device. In this contactless method of supplying power, power supply stand output is set with a power output threshold value that is optimum for the maximum specified power of the portable device. Specifically, this method has the characteristic that foreign objects can be detected while supplying an amount of power suitable for the portable device.

In the contactless method of supplying power of the present invention, the power output threshold value can be set according to the maximum rated power of the portable device and the transmission efficiency. In this contactless method of supplying power, power supply stand output is set with a power output threshold value that is optimum for the maximum specified power of the portable device and the transmission efficiency, and the method has the characteristic that foreign objects can be detected while supplying a given amount of power to the portable device.

In the contactless method of supplying power of the present invention, the power supply stand can be a charging pad, the portable device can be a battery powered device, and a battery housed in the battery powered device can be charged by power supplied from the charging pad to the battery powered device. This contactless method of supplying power has the characteristic that the battery powered device can be placed on the charging pad, power can be transmitted from the charging pad to the battery powered device, and the battery in the battery powered device can be charged while reliably detecting foreign objects on the charging pad.

In the contactless method of supplying power of the present invention, the battery powered device can charge the internal battery by constant voltage-constant current charging. This contactless method of supplying power can stably charge batteries such as lithium ion batteries or lithium polymer batteries with constant voltage-constant current characteristics. The above and further objects of the present invention as well as the features thereof will become more apparent from the following detailed description to be made in conjunction with the accompanying drawings.

DETAILED DESCRIPTION OF THE INVENTION

The following describes embodiments of the present invention based on the figures.

Figure 1:
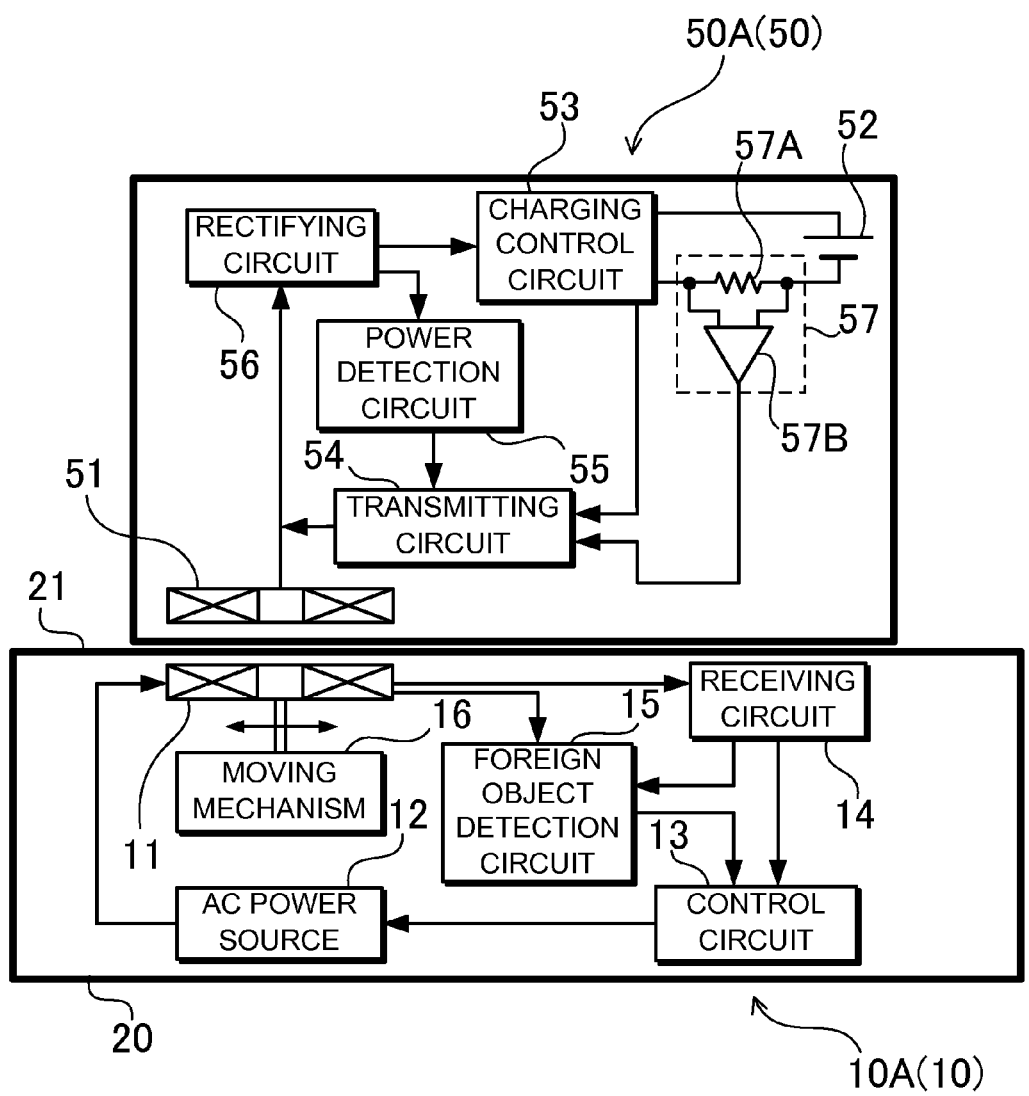
FIG. 1 is a block diagram of a power transmitting power supply stand and portable device for an embodiment of the contactless power supply method of the present invention.

FIG. 1 is a block diagram showing a power supply stand that transmits power and portable device for the contactless method of supplying power of the present invention. This figure shows a portable device 50 placed on a power supply stand 10 to supply power from the power supply stand 10 to the portable device 50. In the embodiment described below, the power supply stand 10 is a charging pad 10A, the portable device 50 is a battery powered device 50A, and power is supplied from the charging pad 10A to the battery powered device 50A to charge a battery 52 housed in the battery powered device 50A.

However, the present invention does not limit the power supply stand to a charging pad and the portable device to a battery powered device. Power can also be supplied from the power supply stand to a portable device that is an illumination device or a charging adapter. A portable device that is an illumination device lights an illumination source with power supplied from the power supply stand. A portable device that is a charging adapter uses power supplied from the power supply stand to supply charging power to charge a battery housed in a battery powered device that connects to the charging adapter. Further, the portable device can be a battery pack as well.

The portable device 50 in FIG. 1 is a battery powered device 50A, and that portable device 50 houses a receiving coil 51 that magnetically couples with the power supply stand 10 transmitting coil 11. The battery 52 is charged with power induced in the receiving coil 51. Accordingly, the portable device 50 in FIG. 1 is provided with a battery 52; a receiving coil 51; a rectifying circuit 56 that converts AC induced in the receiving coil 51 to direct current (DC); a power detection circuit 55 that detects received power from rectifying circuit 56 output, compares the received power with the power required to charge the battery 52, and issues power adjustment signals, a charging control circuit 53 that regulates the current and voltage of DC output from the rectifying circuit 56 for battery 52 charging; a current detection circuit 57 that detects battery 52 charging current, and a transmitting circuit 54 that transmits the current detected by the current detection circuit 57 to the power supply stand 10.

The battery 52 is a lithium ion battery or a lithium polymer battery. However, the battery can be any battery that can be charged such as a nickel hydride battery or a nickel-cadmium battery. The portable device 50 houses one or a plurality of batteries 52. In the case of a plurality of batteries 52, battery cells are connected in series or parallel, or in a series-parallel combination.

The rectifying circuit 56 performs full-wave rectification of AC induced in the receiving coil 51 with a diode-bridge and smoothes ripple current with a smoothing capacitor. Although the rectifying circuit can rectify AC with a diode-bridge, field-effect transistors (FETs) can also be connected in a bridge configuration and switched ON and OFF in phase with the AC to implement a synchronous rectifying circuit. In a synchronous rectifying circuit, FET ON-resistance is low, rectifying circuit heat generation is low, and temperature rise inside the case of the portable device can be limited. Further, a smoothing capacitor is not necessarily required for battery charging with output from a diode-bridge or synchronous rectifying circuit.

The power detection circuit 55 compares (with given periodicity) received power output from the rectifying circuit 56 to the required power, and outputs power adjustment signals to the power supply stand 10 via the transmitting circuit 54. The power detection circuit 55 determines received power from the product of the rectifying circuit 56 output voltage and current. Power adjustment signals are either increase-power-request signals to increase power supply stand 10 output or decrease-power-request signals to reduce power supply stand 10 output. An increase-power-request signal is output when the received power is less than the required power, and a decrease-power-request signal is output when the received power is greater than the required power. The power detection circuit 55 establishes the required power from battery 52 parameters such as battery type, voltage, and charging current. Since a battery powered device 50A housing a lithium ion or lithium polymer battery charges the battery 52 with constant voltage-constant current characteristics, charging current decreases as the battery 52 approaches full-charge. Accordingly, requested power is reduced as the battery 52 approaches full-charge. The power detection circuit 55 compares received power with required power and issues power adjustment signals to assure that optimal power is supplied to the load. In FIG. 1, the portable device 50 is a battery powered device 50A, and the received power is used to charge the battery 52. Although the requested power is power used to charge the battery 52 in this type of portable device 50, the portable device is not necessarily limited a device housing a battery. In general, the requested power is the power supplied to the load of the portable device.

The charging control circuit 53 charges a lithium ion or lithium polymer battery with constant voltage-constant current charging, and charges a nickel hydride or nickel cadmium battery with constant current charging. In addition, the charging control circuit 53 detects full-charge of the battery 52 and sends a full-charge signal to the power supply stand 10 via the transmitting circuit 54. The power supply stand 10 detects the full-charge signal sent from the portable device 50 transmitting circuit 54 with its receiving circuit 14. When a full-charge signal is detected, a control circuit 13 controls the AC power source 12 to stop supplying power to the transmitting coil 11.

The transmitting circuit 54 sends various signals from the portable device 50 to the power supply stand 10. Signals sent from the transmitting circuit 54 to the power supply stand 10 include increase-power-request signals and decrease-power-request signals to increase or decrease power supply stand 10 output, battery 52 charging current signals, battery 52 voltage signals, battery 52 full-charge signals, and battery 52 type identification signals. The transmitting circuit 54 varies (modulates) the receiving coil 51 load impedance to send various signals to the transmitting coil 11. The transmitting circuit 54 has a modulating circuit connected to the receiving coil 51. The modulating circuit has a switching device connected in series with a capacitive and/or resistive load and transmits various signals to the power supply stand 10 by switching the switching device ON and OFF.

The power supply stand 10 receiving circuit 14 detects transmitting coil 11 impedance change, voltage change, or current change to detect signals sent from the transmitting circuit 54. When the load impedance of the receiving coil 51 is varied, parameters such as impedance, voltage, and current in the transmitting coil 11, which is magnetically coupled with the receiving coil 51, also vary. Therefore, the receiving circuit 14 can detect portable device 50 signals by detecting variation in transmitting coil 11 parameters.

However, the transmitting circuit can also be a transmitter that transmits a modulated carrier wave. The receiving circuit to receive the carrier wave and detect signals sent from this type of transmitting circuit is a (wireless) receiver. In general, the transmitting circuit and receiving circuit can have any circuit configuration that enables signals to be transmitted from the portable device and received by the power supply stand.

The current detection circuit 57 detects battery 52 charging current. The current detection circuit 57 in FIG. 1 is provided with a current detection resistor 57A connected in series with the battery 52, and a difference amplifier 57B that amplifies the voltage across the current detection resistor 57A. Battery 52 charging current is determined from the output of the difference amplifier 57B. The battery 52 charging current is the rectifying circuit 56 output current, which results from power induced in the receiving coil 51. Specifically, rectifying circuit 56 output detected by the current detection circuit 57 depends on the power induced in the receiving coil 51. Consequently, battery 52 charging current can also be determined by detecting rectifying circuit 56 output current or by detecting receiving coil 51 output.

The power supply stand 10 has a case 20 provided with an upper plate 21 on its top surface where the portable device 50 is positioned, and the transmitting coil 11 is disposed on the inside of the upper plate 21. The transmitting coil 11 is connected to the AC power source 12 and the AC power source 12 is controlled by the control circuit 13.

The control circuit 13 controls the AC power source 12 to regulate power supplied to the transmitting coil 11 according to power adjustment signals sent from the portable device 50. The control circuit 13 supplies the power requested by the portable device 50 by increasing power to the transmitting coil 11 when an increase-power-request signal is input from the receiving circuit 14, and by decreasing power to the transmitting coil 11 when a decrease-power-request signal is input. However, the control circuit 13 limits AC power source 12 output at or below the power output threshold value. Specifically, the maximum power output from the AC power source 12 is limited to the power output threshold value. For increase-power-request signals, the control circuit 13 increases AC power source 12 output up to the power output threshold value, but when AC power source 12 output has increased up to the power output threshold value, the control circuit 13 does not further increase AC power source 12 output even when increase-power-request signals are detected. The control circuit 13 continuously controls AC power source 12 output at or below the power output threshold value.

Figure 2:
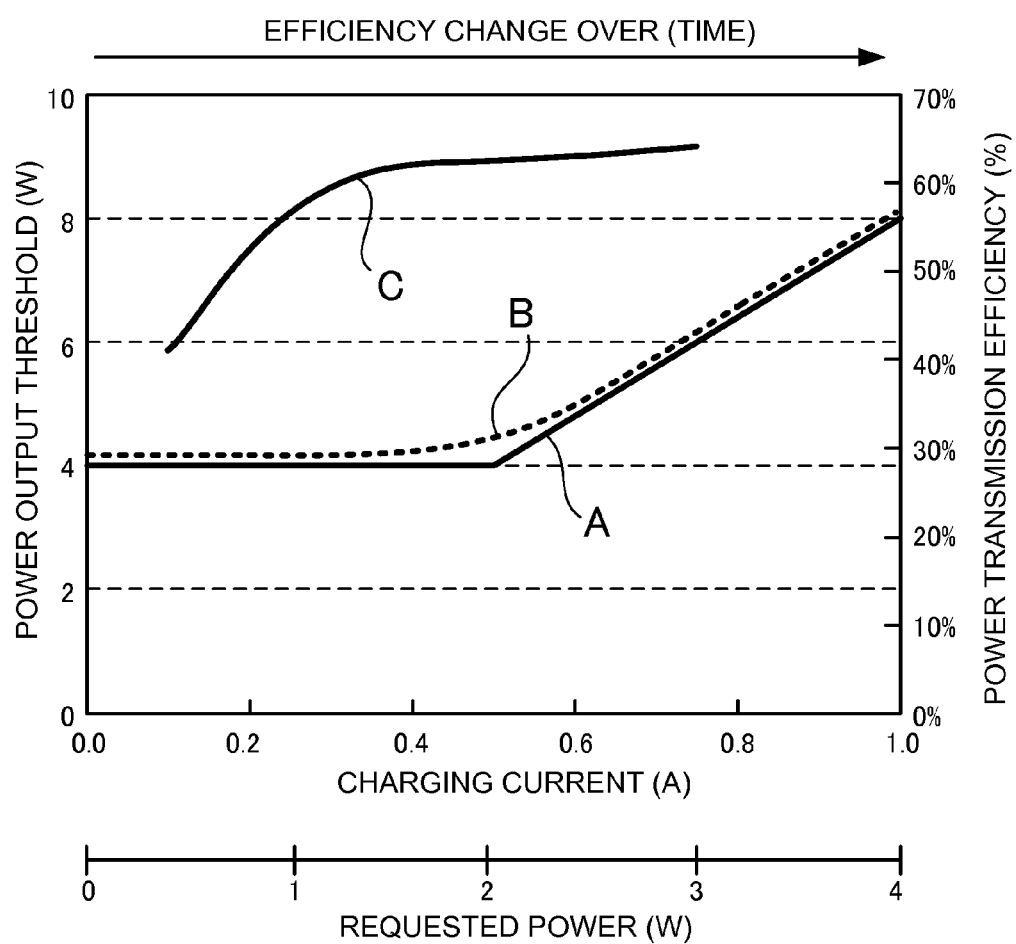
FIG. 2 is a graph showing power transmission efficiency and the power output threshold as function of the requested power.

Turning to FIG. 2, curve A shows power output threshold values. This figure shows power output threshold as function of charging current and requested power. The horizontal axes of the graph are charging current and requested power for the case of a 4V battery 52, and curve A shows power output threshold variation as a function of the charging current and requested power. In this figure, power output threshold varies as a function of portable device 50 requested power and gradually increases with increasing requested power after a set requested power has been reached. In the specific case where the portable device 50 is a battery powered device 50A and the power supply stand 10 is a charging pad 10A, power requested by the portable device 50 is proportional to the charging current of the internal battery 52. This is because power for charging the battery 52 is the product of the battery 52 charging current and voltage. Power output threshold shown by curve A is constant at or below a set value of requested power and increases proportional to the requested power above the set value. Power output threshold could also increase with increasing requested power as shown by the broken line of curve B.

The control circuit 13 regulates AC power source 12 output to the transmitting coil 11 while limiting output to the power output threshold value indicated by curve A in FIG. 2. Power output threshold values shown in FIG. 2 can be determined from the received power and a foreign object detection threshold (efficiency) for detecting foreign objects. The foreign object detection threshold (efficiency) is the power transmission efficiency that restrains foreign object temperature rise to an allowable temperature without stopping power transmission. The foreign object detection threshold (efficiency) can have a value such as 15% to 30% below the transmission efficiency when no foreign objects are present. For example, if the foreign object detection threshold (efficiency) is 45% and the received power is 3.6 W, the power output threshold value for that received power is computed to be 3.6 W/(0.45)=8 W. Accordingly, when the received power is 3.6 W, power is transmitted to the portable device 50 while the control circuit 13 controls AC power source 12 output at or below 8 W.

A power supply stand 10 that sets the power output threshold according to curve A in FIG. 2 supplies power to the portable device 50 and detects foreign objects in the following manner. When the portable device 50 is a battery powered device 50A that charges a 4V battery 52 with a constant charging current of 0.5 A, namely when portable device 50 required power is 2 W, the power supply stand 10 supplies power to the portable device 50 while limiting output to a power output threshold value of approximately 4 W. Under these conditions with no foreign objects present, power transmission efficiency is approximately 65% as shown by curve C in FIG. 2. Accordingly, the power supply stand 10 can supply the required power of 2 W, which is the received power at the portable device 50, by outputting 2 W/(0.65)3 W from the AC power source 12. Specifically, the power requested by the portable device 50 can be supplied by adjusting AC power source 12 output below the power output threshold value of 4 W. Under the same conditions only with a foreign object on the power supply stand 10 and power transmission efficiency reduced to 45%, even when the power supply stand 10 increases AC power source 12 output to the power output threshold value of 4 W, received power at the portable device 50 is reduced to 1.8 W=4 W·(0.45). Since received power of 1.8 W is below the portable device 50 required power of 2 W, the portable device 50 issues an increase-power-request signal. However, even when the power supply stand 10 detects the portable device 50 increase-power-request signal, it has already increased output to the power output threshold value and does not increase output above that threshold value. As a result, portable device 50 received power does not increase to the required power, and the portable device 50 continuously outputs increase-power-request signals to the power supply stand 10. The power supply stand 10 detects continuous transmission of increase-power-request signals and concludes that a foreign object is present. Having determined the presence of a foreign object, the power supply stand 10 cuts-off power to the transmitting coil 11 and stops transmitting power to the portable device 50. However, when the power supply stand 10 determines that a foreign object is present, it can also set AC power source 12 output to a minimal value to supply a minimal amount of power to the portable device 50 while restraining foreign object heating.

Foreign object detection via increase-power-request signals can also be performed by the portable device 50 rather than by the power supply stand 10. When a foreign object is present, the portable device 50 continuously issues increase-power-request signals. Consequently, the portable device 50 can determine foreign object presence by detecting increase-power-request signals output continuously over a given time period. When the portable device 50 detects a foreign object, it sends a foreign object detection signal to the power supply stand 10 via the transmitting circuit 54. The power supply stand 10 detects a foreign object detection signal sent from the transmitting circuit 54 with its receiving circuit 14.

Although the power supply stand 10 described above sets the power output threshold according to the power required by the portable device 50, power output threshold can be set according to the maximum specified (rated) power of the portable device 50. In that case, the contactless method of supplying power sends a signal indicating the maximum specified power from the portable device 50 to the power supply stand 10, and the power supply stand 10 sets the power output threshold according to that maximum specified power. In this method, the power output threshold value is set by maximum rated power and the power transmission efficiency. For example, if power transmission efficiency is 50% (0.5) with a foreign object present, the power output threshold value is set to twice the maximum specified power.

The power supply stand 10 magnetically couples the transmitting coil 11 and the receiving coil 51 and transmits (supplies) power from the transmitting coil 11 to the receiving coil 51. A power supply stand 10 that charges the battery 52 in a portable device 50 placed in any location on its upper plate 21 houses a moving mechanism 16, which moves the transmitting coil 11 into close proximity with the receiving coil 51. In this power supply stand 10, the transmitting coil 11 is disposed under the upper plate 21 of the case 20 and is moved along the bottom of the upper plate 21 to a position in close proximity to the receiving coil 51.

The power supply stand 10 and portable device 50 can be configured to allow the portable device 50 to be set in a fixed position in an alignment section of the power supply stand 10. The portable device 50 is set in a fixed location in the alignment section structure of the power supply stand 10 to put the receiving coil 51 in close proximity to the transmitting coil 11. With the receiving coil 51 in close proximity to the transmitting coil 11, power is transmitted by magnetic induction from the transmitting coil 11 to the receiving coil 51.

Figure 3:
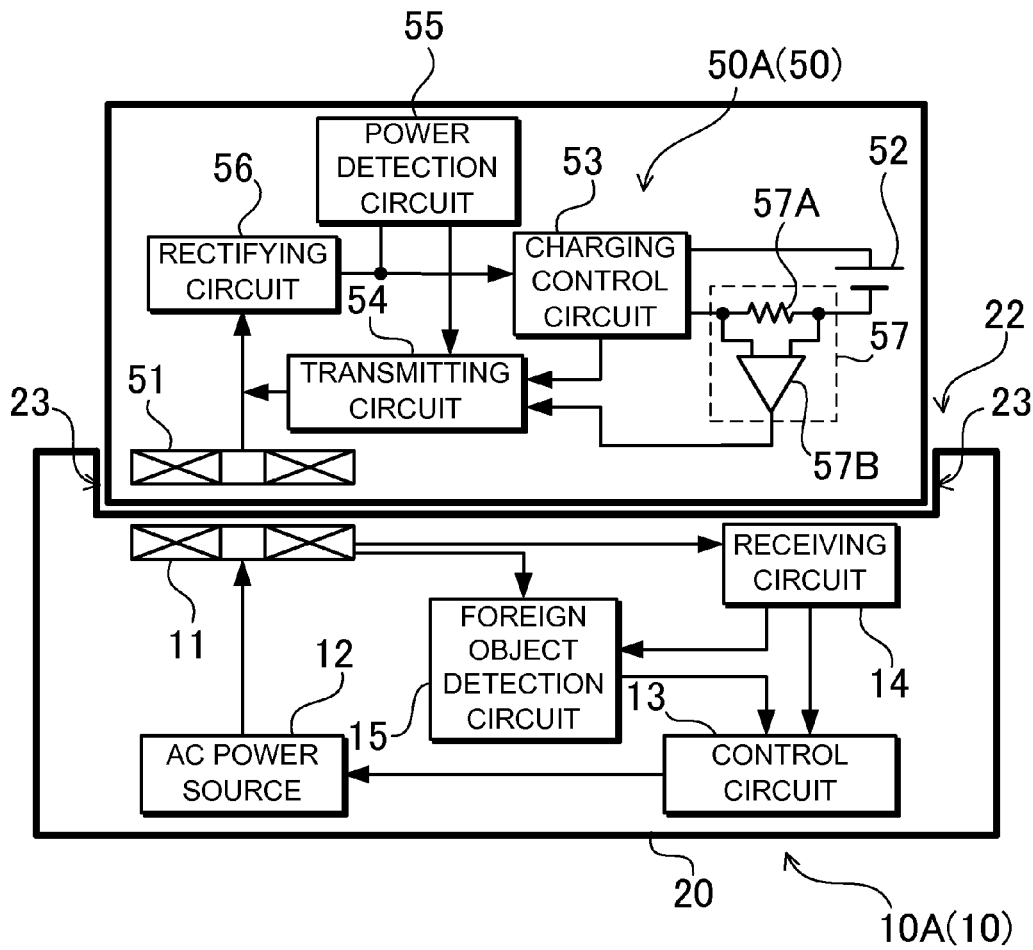
FIG. 3 is a cross-section schematic showing a portable device placed in a set location on a power supply stand configured with an alignment section.

The alignment section structure 22 in FIG. 3 is a fit-together configuration for setting the portable device 50 in a fixed position on the power supply stand 10. In the fit-together configuration of FIG. 3, the portable device 50 fits in a cavity 23 established in the upper surface of the power supply stand 10 to hold the portable device 50 in a fixed position. An alignment section structure could also hold the portable device in a fixed position on the power supply stand by establishing interlocking protrusions and depressions on the mating surfaces of the power supply stand and portable device.

The transmitting coil 11 is a planar (flat) coil wound in a spiral shape in a plane parallel to the upper plate 21 that radiates AC magnetic flux above the upper plate 21. This transmitting coil 11 emits AC magnetic flux perpendicular to, and beyond (above) the upper plate 21. The transmitting coil 11 is supplied with AC power from the AC power source 12 and radiates AC magnetic flux above the upper plate 21. Transmitting coil 11 wire can be wound around magnetic core material (not illustrated) to increase coil inductance. A transmitting coil with a core can focus magnetic flux in a specific region to efficiently transmit power to the receiving coil. However, a magnetic material core is not necessarily required for the transmitting coil, and a coil with no core can also be used. Since a coil with no core is light, the moving mechanism can be simplified in a configuration that moves the transmitting coil inside the top plate. The transmitting coil 11 is made with essentially the same outside diameter as the receiving coil 51 to efficiently transmit power to the receiving coil 51.

The AC power source 12 supplies high frequency power such as 20 kHz to 1 MHz power to the transmitting coil 11. In a power supply stand 10 that moves the transmitting coil 11 into close proximity with the receiving coil 51, the AC power source 12 is connected to the transmitting coil 11 via flexible leads. The AC power source 12 is provided with an oscillator circuit, and a power amplifier to amplify the AC power output from the oscillator circuit.

With the transmitting coil 11 in close proximity with the receiving coil 51, the power supply stand 10 supplies AC power from the AC power source 12 to the transmitting coil 11. Transmitting coil 11 AC power is transmitted to the receiving coil 51 to charge the battery 52. When the battery 52 becomes fully-charged, a full-charge signal is sent from the portable device 50 and the power supply stand 10 stops supplying power to the transmitting coil 11 to stop battery 52 charging.

A foreign object detection circuit 15 detects the presence of foreign objects from increase-power-request signals sent from the portable device 50. If continuous transmission of increase-power-request signals is detected over a given time period, a foreign object is judged to be on the power supply stand 10. When increase-power-request signals are transmitted, no foreign object presence is judged unless transmission is continuous over the preset time period. The portable device 50 compares received power sent from the power supply stand 10 with the required power, and sends an increase-power-request signal to the power supply stand 10 to increase power supply stand 10 output when the received power is less than the required power. When the received power is greater than the required power, the portable device 50 sends a decrease-power-request signal to the power supply stand 10 to reduce power supply stand 10 output. When the power supply stand 10 detects an increase-power-request signal from the portable device 50, it increases transmitting coil 11 output, which is the transmitted power, to raise portable device 50 received power to the requested power.

As a specific example in the case of a lithium ion battery 52, the charging control circuit 53 charges the battery 52 by constant voltage-constant current charging. The power supply stand 10 control circuit 13 controls the AC power source 12 to regulate transmitting coil 11 output based on power adjustment signals received by the receiving circuit 14. Power adjustment depends on portable device 50 battery 52 data such as voltage and current. For example, when the maximum voltage for charging is 4.2V, charging is performed with a specified constant current at or below a battery voltage of 4.2V. When the transmitting coil 11 output is adjusted and the voltage of the battery 52 becomes 4.2V, the power supply stand 10 control circuit 13 controls the AC power source 12 and adjusts transmitting coil 11 output (with alternating increase and decrease power requests) according to power adjustment signals received by the receiving circuit 14 to maintain a battery voltage of 4.2V.

When there are no foreign objects on the power supply stand 10, power is transmitted from the transmitting coil 11 to the receiving coil 51 to supply power from the power supply stand 10 to the portable device 50 with good efficiency. Under these conditions, power transmission efficiency from the power supply stand 10 to the portable device 50 is high as shown by curve C in FIG. 2. The power transmission efficiency in this figure is determined by the following equation.

$$\text{power transmission efficiency} = (\text{portable device received power})/(\text{power supply stand output power})$$

Specifically, power transmission efficiency can be determined at the power supply stand 10 by dividing the product of secondary-side (portable device-side) battery voltage and charging current, which are battery data sent from the portable device 50, by the product of primary-side (power supply stand-side) output voltage and current.

Figure 4:
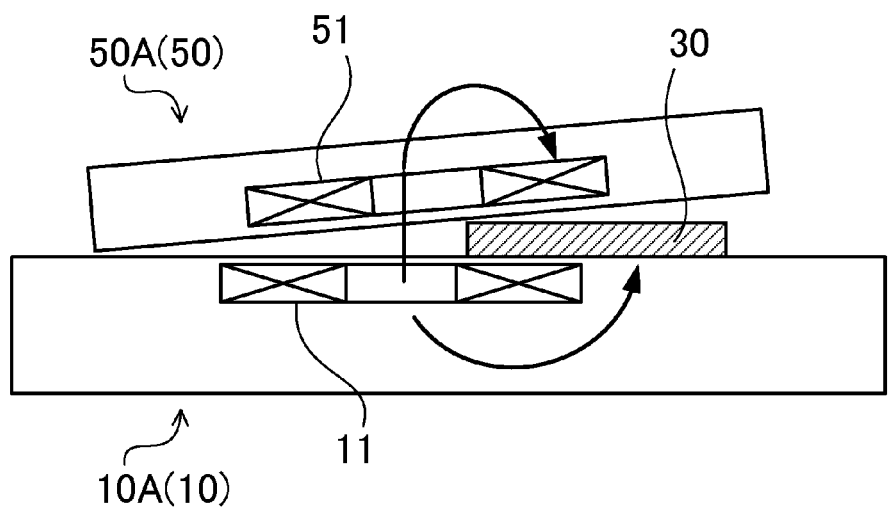
FIG. 4 is a cross-section view showing a portable device placed on a power supply stand along with a foreign object.

However, when a metal foreign object is on the power supply stand 10, some of the transmitting coil 11 output is absorbed by the metal foreign object. In particular, when a foreign object 30 is positioned close to the transmitting coil 11 as shown in FIG. 4, the foreign object 30 absorbs a large amount of power, induced current flows in the foreign object 30 generating heat, and power transmission efficiency drops. When transmission efficiency drops, portable device 50 received power decreases. To make the received power increase and approach the required power, the portable device 50 sends an increase-power-request signal to the power supply stand 10 requesting an increase in power supply stand 10 output. The power supply stand 10 detects the increase-power-request signal and increases output.

Here, although the power supply stand 10 output increase makes the power received by the portable device 50 approach the required power, it also increases induced current and heating in the foreign object 30. Consequently, if the power supply stand 10 increases output until the portable device 50 received power rises to the required power, foreign object 3 heat generation can become excessive.

To prevent this detrimental condition, the power supply stand 10 limits its maximum output to the power output threshold value. Specifically, the power supply stand 10 increases output when it is below the power output threshold value and an increase-power-request signal is detected, but does not increase output when it is at the power output threshold value even when increase-power-request signals are detected. The power output threshold is set to a value that allows the required power to be supplied from the power supply stand 10 to the portable device 50 when no foreign objects are present. Further, the power output threshold is set to a value that avoids heating a foreign object to an excessively high temperature when power is supplied from the power supply stand 10 to the portable device 50 and a foreign object is on the power supply stand 10.

Figure 5:
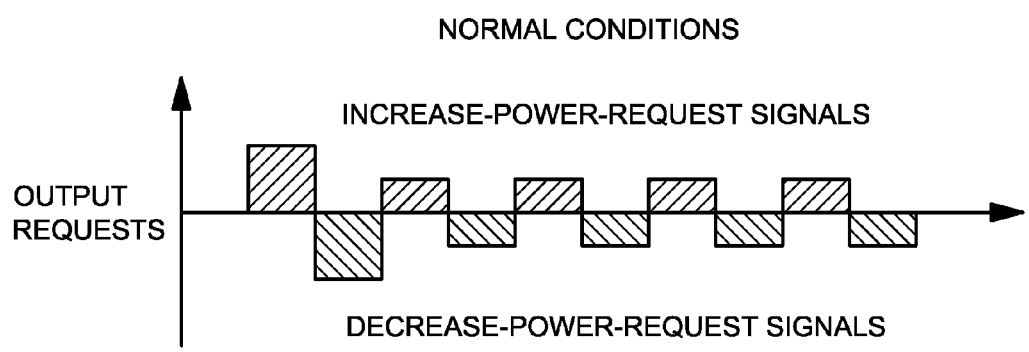
FIG. 5 is a requested power output graph showing power adjustment signals issued by the portable device when no foreign objects are present.

The power supply stand 10 increases output when an increase-power-request signal is detected, but it limits increase in maximum output to the power output threshold value. When no foreign objects are present, the power supply stand 10 supplies the requested power to the portable device 50. FIG. 5 shows increase-power-request signals and decrease-power-request signals issued from the portable device 50 to the power supply stand 10 to make received power approach the requested power. As shown in FIG. 5, the portable device 50 compares received power and required power, and sends increase-power-request signals and decrease-power-request signals to the power supply stand 10. The power supply stand 10 controls output according to the increase-power-request signals and decrease-power-request signals and regulates portable device 50 received power to meet the required power.

Figure 6:
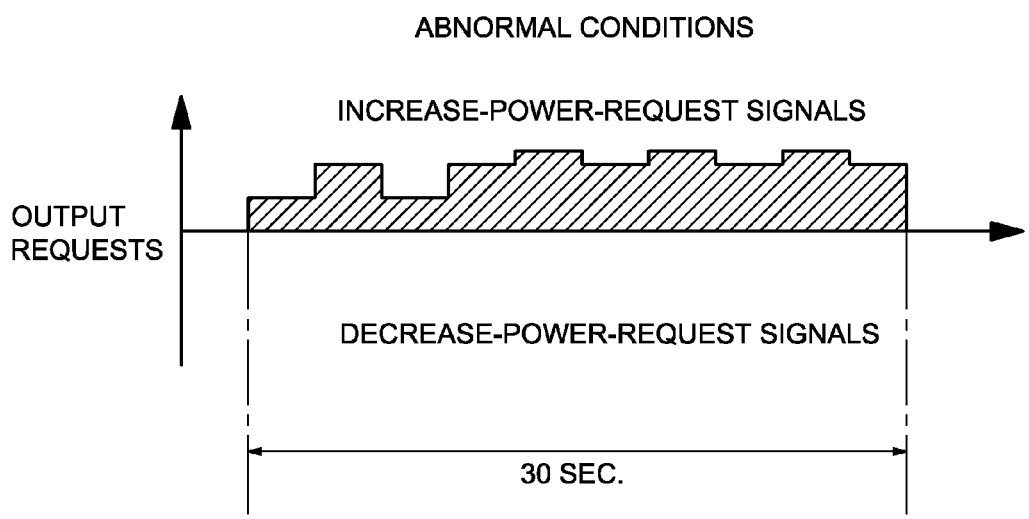
FIG. 6 is a requested power output graph showing power adjustment signals issued by the portable device when a foreign object is present.

FIG. 6 shows increase-power-request signals issued by the portable device 50 when a foreign object is on the power supply stand 10 along with the portable device 50 and some of the transmitting coil 11 power is absorbed by the foreign object. Since the foreign object absorbs some of the transmitting coil 11 power, transmission efficiency is decreased. Consequently, power output by the transmitting coil 11 is not effectively supplied to the receiving coil 51, and power received by the portable device 50 is reduced. The portable device 50 determines that the received power is less than the requested power and issues an increase-power-request signal. The power supply stand 10 detects the increase-power-request signal and increases output. Although the power supply stand 10 increases output, the foreign object absorbs some transmitting coil 11 output and the power received by the portable device 50 does not rise to the requested power. As a result, the portable device 50 continuously issues increase-power-request signals. The power supply stand 10 repeatedly detects increase-power-request signals and gradually increases output up to the power output threshold value. Even when the power supply stand 10 has increased output to the power output threshold value, transmitting coil 11 output is partially absorbed by the foreign object and portable device 50 received power does not increase to the requested power. Therefore, the portable device 50 continues to output increase-power-request signals to the power supply stand 10. Since the power supply stand 10 has already increased output to the maximum power output threshold value, it limits output to that threshold value and does not increase output even when an increase-power-request signal is detected. These conditions persist and the portable device 50 continues to send increase-power-request signals. Specifically, when a foreign object is placed on the power supply stand 10 along with the portable device 50 and that foreign object absorbs power, the power supply stand 10 limits output to the power output threshold value, power received by the portable device 50 does not meet the requested power, and the portable device 50 continuously outputs increase-power-request signals. In this situation, when the foreign object detection circuit 15 detects continuous portable device 50 increase-power-request signals output for a set time period, it judges that a foreign object is on the power supply stand 10. The set time period for judging foreign object presence when increase-power-request signals are output continuously is preloaded in power supply stand 10 memory. This time period is set, for example from 5 sec to 60 sec, preferably from 10 sec to 45 sec, and more preferably from 20 sec to 30 sec. Shortening the set time period allows rapid foreign object detection, and lengthening the set time period allows reliable foreign object detection. Accordingly, the time period is set to an optimum value considering the required speed and accuracy for foreign object detection.

The amplitude of the power adjustment signals in FIGS. 5 and 6 varies according to the amount of difference between the required power and the received power. The portable device 50 compares the received power to the required power and issues increase-power-request signals and decrease-power-request signals. However, the increase-power-request signals and decrease-power-request signals are modulated according to the amount of difference between the required power and the received power. When the received power is less than the required power and that difference is large, the portable device 50 issues an increase-power-request signal that will increase output by a large amount. When that difference is small, the portable device 50 issues an increase-power-request signal that will increase output by a small amount. However, the portable device 50 can also issue power adjustment signals that simply increase or decrease output and do not indicate the magnitude of difference between the required power and the received power.

When the power supply stand 10 detects an increase-power-request signal or decrease-power-request signal indicating the amount output increase or decrease requested, it increases or decreases output according to the amplitude of the power adjustment signal. However, if the increase-power-request signal or decrease-power-request signal simply indicates an output increase or decrease with no information indicating the amount of increase or decrease, the power supply stand 10 can increase or decrease output by a constant amount.

If the foreign object detection circuit 15 detects a foreign object, it outputs a detection signal to the control circuit 13. The control circuit 13 stops supplying power to the transmitting coil 11 when it receives a foreign object detection signal. However, when a foreign object is detected, the control circuit 13 can also adjust the power supplied to the transmitting coil 11 to a preset minimum value. Or, in a method that sets the power output threshold to a value that allows continued power transmission without heating the foreign object to an excessive temperature, output from the power supply stand can be limited to the power output threshold value and power transmission to the portable device can be continued without stopping when a foreign object is detected.

Figure 7:
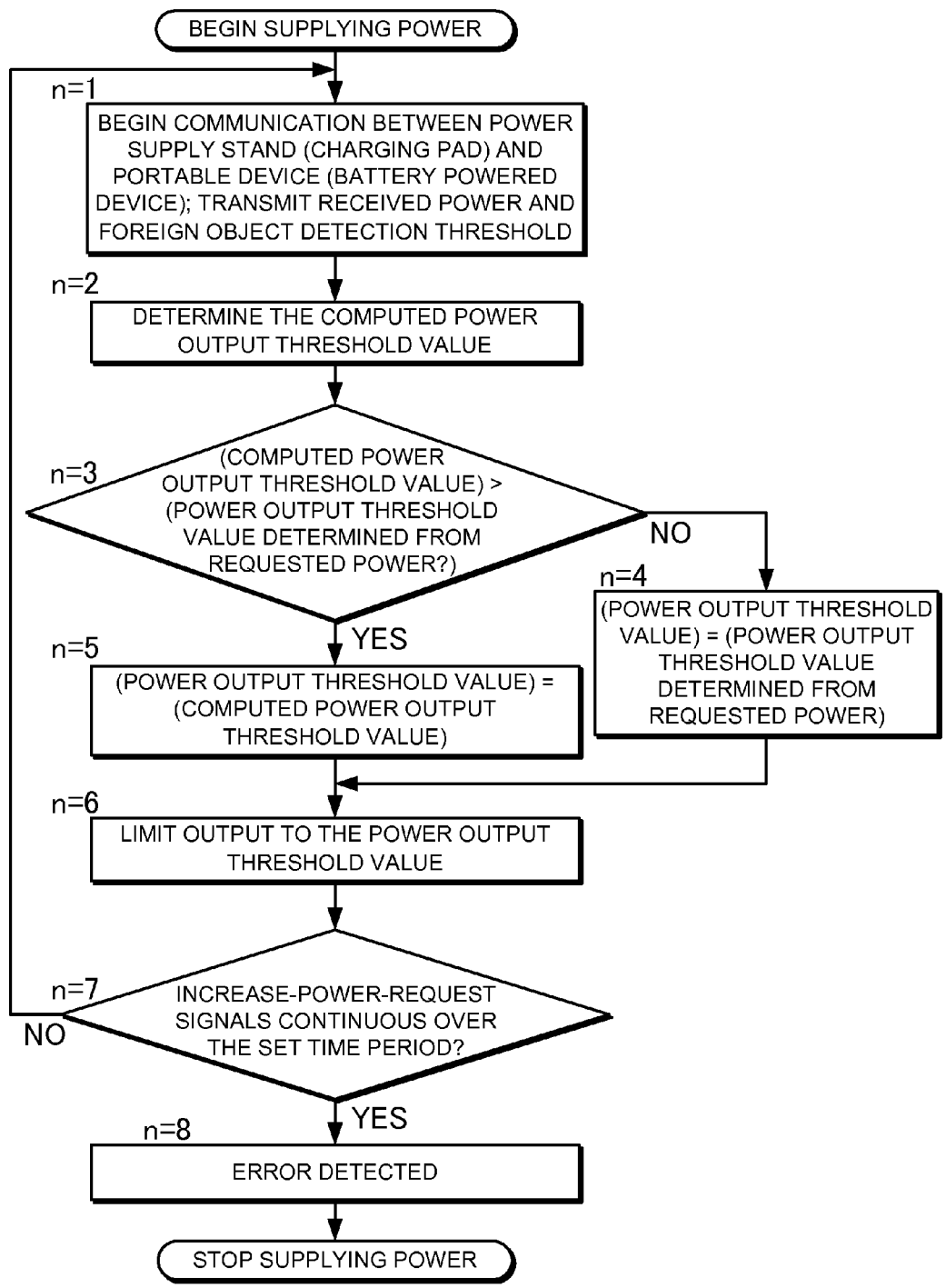
FIG. 7 is a flowchart for determining whether or not a foreign object is on the power supply stand.

The power supply stand 10 and portable device 50 described above detect foreign objects according to the flowchart shown in FIG. 7 and described below.

[Step n=1]

When the portable device 50 is placed on the power supply stand 10, communication is initiated between the battery powered device 50A, which is the portable device 50, and the charging pad 10A, which is the power supply stand 10. The received power (for example, 1.6 W for a battery 52 voltage of 4V and charging current of 0.4 A) and foreign object detection threshold (efficiency) (for example, 45%) are transmitted from the portable device 50 to the power supply stand 10.

[Step n=2]

The power supply stand 10 determines a computed power output threshold value, which is the power that can be transmitted to the portable device 50 while keeping foreign object heat generation below a set temperature, from the received power and foreign object detection threshold (efficiency) sent from the portable device 50 using the following equation.

computed power output threshold value=(received power)/(foreign object detection threshold [efficiency])

For example, if battery voltage is 4V, charging current is 0.4 A, received power is 1.6 W, and the foreign object detection threshold (efficiency) is 0.45, the computed power output threshold value is 1.6 W/(0.45)≈3.6 W. Namely, the power that can charge the battery 52 when a foreign object is placed along with the portable device 50 is 3.6 W.

[Steps n=3 through n=5]

Step n=3 compares the computed power output threshold value with the power output threshold value (4 W) determined from FIG. 2 with a requested power of 1.6 W (0.4 A of charging current). When the computed power output threshold value is less than the power output threshold value determined from the requested power in FIG. 2, step n=4 sets the power output threshold to the value (4 W) determined from the requested power. When the computed power output threshold value is greater than the power output threshold value determined from the requested power in FIG. 2, step n=5 sets the power output threshold to the computed power output threshold value.

[Steps n=6 through n=8]

The power supply stand 10 limits output to the power output threshold value. While limiting power supply stand 10 output to the power output threshold value, step n=7 judges whether or not increase-power-request signals are output continuously from the portable device 50 for the set time period (20 sec or 30 sec). If increase-power-request signals are continuously output from the portable device 50 over the set time period, a foreign object is determined to be present, which is detection of an error condition (step n=8), and power supply stand 10 output is cut-off to stop charging. If increase-power-request signal output does not persist for the set time period, control loops back to step n=1.

In the power supply stand 10 described above, the control circuit 13 controls the AC power source 12 to limit AC power source 12 output at or below the power output threshold value. However, the power supply stand control circuit does not always necessarily have to limit AC power source output to the power output threshold value. The power supply stand can also limit output by using an AC power source with a specified maximum output power. Here, the AC power source increases output up to the maximum output power, but is physically limited from increasing power beyond that value. Accordingly, by setting the maximum power output threshold value to the maximum output power of the AC power source, the power supply stand can supply power while limiting AC power source output at or below the power output threshold value.

The contactless method of supplying power of the present invention can be applied most suitably as a method of charging a battery by transmitting power via magnetic induction from a power supply stand that is a charging pad, etc. to a portable device that is a battery powered device, etc. Further, the method is not limited to battery charging applications and can also be used to supply power in a contactless manner to devices such as illumination devices or charging adapters. It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2012-100410 filed in Japan on Apr. 25, 2012, the content of which is incorporated herein by reference.

What is claimed is:

1. A contactless method of supplying power comprising:
    placing a portable device housing a receiving coil on a power supply stand provided with a transmitting coil and magnetically coupling the receiving coil of portable device to the transmitting coil of the power supply stand; and
    transmitting power from the transmitting coil to the receiving coil by magnetic induction while transmitting power adjustment signals from the portable device to the power supply stand, the power supply stand adjusting a transmitting coil output and supplying power requested by the portable device based on the power adjustment signals,
    wherein the power supply stand limits maximum output to a power output threshold value;
    wherein the portable device compares the power received from the power supply stand to a required power, and
    if the received power is lower than the required power, then the portable device sends an increase-power-request signal to the power supply stand as the power adjustment signal and the power supply stand increases the transmitting coil output, and
    if the received power is greater than the required power, then the portable device sends a decrease-power-request signal to the power supply stand and the power supply stand decreases the transmitting coil output,
    wherein the power supply stand adjusts output while limiting it to the power output threshold value, and
    wherein the power supply stand detects a duration of the increase-power-request signals from the portable device to the power supply stand, and if the increase-power-request signals are longer than a preset time period, then the power supply stand determines that a foreign object is present on the power supply stand.

2. The contactless method of supplying power as recited in claim 1, wherein the power supply stand varies the power output threshold value according to the power requested by the portable device, and increases the power output threshold value when the requested power increases.

3. The contactless method of supplying power as recited in claim 1, wherein the power supply stand sets the power output threshold value from the portable device received power and the foreign object detection threshold value or efficiency for foreign object detection.

4. The contactless method of supplying power as recited in claim 1, wherein the power supply stand sets the power output threshold value from the maximum rated power of the portable device.

5. The contactless method of supplying power as recited in claim 1, wherein the power supply stand sets the power output threshold value from the maximum rated power of the portable device and the power transmission efficiency.

6. The contactless method of supplying power as recited in claim 1, wherein the power supply stand is a charging pad, the portable device is a battery powered device, and a battery housed in the battery powered device is charged by power supplied from the charging pad to the battery powered device.

7. The contactless method of supplying power as recited in claim 6, wherein the battery powered device charges the internal battery by constant voltage-constant current charging.

* * * * *